US008400154B1

(12) United States Patent
Olsson et al.

(10) Patent No.: US 8,400,154 B1
(45) Date of Patent: Mar. 19, 2013

(54) LOCATOR ANTENNA WITH CONDUCTIVE BOBBIN

(75) Inventors: Mark S. Olsson, La Jolla, CA (US); Stephen M. Bench, Carlsbad, CA (US); Ryan B. Levin, San Diego, CA (US); Ray Merewether, La Jolla, CA (US)

(73) Assignee: SeekTech, Inc., San Diego, CA (US)

( * ) Notice: Subject to any disclaimer, the term of this patent is extended or adjusted under 35 U.S.C. 154(b) by 688 days.

(21) Appl. No.: 12/367,254

(22) Filed: Feb. 6, 2009

Related U.S. Application Data

(60) Provisional application No. 61/033,318, filed on Mar. 3, 2008, provisional application No. 61/027,212, filed on Feb. 8, 2008.

(51) Int. Cl.
*G01V 3/08* (2006.01)
(52) U.S. Cl. .......................................... 324/326
(58) Field of Classification Search .................. 324/326; 323/308
See application file for complete search history.

(56) References Cited

U.S. PATENT DOCUMENTS

| | | | | |
|---|---|---|---|---|
| 2,290,680 A * | 7/1942 | Franz | .............................. | 336/20 |
| 3,549,985 A * | 12/1970 | Penland | .......................... | 324/326 |
| 3,711,807 A * | 1/1973 | Yamashita et al. | ............ | 336/205 |
| 3,717,833 A * | 2/1973 | Kubota et al. | .................. | 336/69 |
| 4,274,136 A * | 6/1981 | Onodera et al. | ................ | 363/68 |
| 4,352,079 A * | 9/1982 | Mueller et al. | ................. | 336/65 |
| 4,455,544 A * | 6/1984 | Sibille et al. | ..................... | 336/65 |
| 4,675,639 A * | 6/1987 | Thaler et al. | .................... | 336/185 |
| 4,812,812 A * | 3/1989 | Flowerdew et al. | ........ | 340/853.6 |
| 4,862,130 A * | 8/1989 | Ellison | .......................... | 336/185 |
| 4,934,048 A * | 6/1990 | McElheny et al. | .............. | 29/856 |
| 4,964,006 A * | 10/1990 | Ota | ............................. | 360/281.1 |
| 5,764,443 A * | 6/1998 | Cho | ............................. | 360/281.5 |
| 6,005,524 A * | 12/1999 | Hayes et al. | .................. | 343/702 |
| 6,008,708 A * | 12/1999 | Endoh et al. | .................. | 335/151 |
| 6,512,438 B1 * | 1/2003 | Yoshimori et al. | ............ | 336/178 |
| 6,768,408 B2 * | 7/2004 | Gilmore et al. | ................ | 336/229 |
| 7,009,482 B2 * | 3/2006 | Kiko et al. | .................... | 336/84 C |
| 7,113,066 B2 * | 9/2006 | Waffenschmidt | ............ | 336/180 |
| 7,760,063 B2 * | 7/2010 | Lin et al. | ....................... | 336/208 |
| 7,786,731 B2 * | 8/2010 | Cole et al. | ..................... | 324/326 |
| 2001/0011414 A1 * | 8/2001 | Antonio et al. | ................. | 29/605 |
| 2001/0038082 A1 * | 11/2001 | Hines et al. | ............. | 251/129.04 |
| 2003/0011532 A1 * | 1/2003 | Yoshinomoto et al. | ....... | 343/895 |

* cited by examiner

*Primary Examiner* — Bot Ledynh
(74) *Attorney, Agent, or Firm* — Steven C. Tietsworth (57) ABSTRACT

An antenna useful in an antenna array of a man-portable buried utility locator includes a flexible bobbin made of copper foil. The bobbin has a plurality of axially spaced grooves and an axially extending gap formed therein. A layer of insulation surrounds an outer surface of the bobbin. A conductive wire is disposed in the grooves and wound around the bobbin over the layer of insulation to form a plurality of axially spaced sub-coils. A layer of copper-foil tape having an insulating backing is wound about the conductive wire and has a second gap aligned with the gap in the bobbin. A layer of a low dielectric material is wound about the copper-foil tape. The antenna provides more antenna wire surface for an equivalent coil cross-sectional area, compared to prior art antennas, thus yielding greater sensitivity. The construction of the antenna provides a series of Faraday-shielded sub-coils, which yield a greater useful antenna bandwidth by moving the inherent resonance of each coil to a higher frequency. The construction of the antenna also reduces inherent winding capacitance and provides a self-shielding effect that further improves sensitivity.

35 Claims, 7 Drawing Sheets

LOCATOR ANTENNA WITH CONDUCTIVE BOBBIN

CROSS-REFERENCES TO RELATED APPLICATION

This application claims the benefit pursuant to 35 USC §§119 and 120 of the filing date of U.S. Provisional Application Ser. No. 61/027,212, filed on Feb. 8, 2008, the entire disclosure of which is entirely incorporated herein by reference.

This application also claims benefit pursuant to 35 USC §§119 and 120 of the filing date of U.S. Provisional Patent Application Ser. No. 61/033,318 filed on Mar. 3, 2008, the entire disclosure of which is hereby incorporated by reference.

This application is also related by inventorship and subject matter to the co-pending U.S. patent application Ser. No. 11/248,539 filed by Mark S. Olsson, et al. on Oct. 12, 2005 and entitled "Reconfigurable Portable Locator Employing Multiple Sensor Array Having Flexible Nested Orthogonal Antennas," the entire disclosure of which is hereby incorporated by reference.

BACKGROUND

1. Field of the Invention

This invention relates to portable locators that sense electromagnetic emissions to thereby locate buried utilities such as pipes and cables.

2. Description of the Related Art

There are many situations where is it desirable to locate buried utilities such as pipes and cables. For example, before starting any new construction that involves excavation, worker safety and project economic concerns require the location and identification of existing underground utilities such as underground power lines, gas lines, phone lines, fiber optic cable conduits, cable television (CATV) cables, sprinkler control wiring, water pipes, sewer pipes, etc., collectively and individually herein referred to as "buried objects."

As used herein, the term "buried objects" includes objects located inside walls, between floors in multi-story buildings or cast into concrete slabs, for example, as well as objects disposed below the surface of the ground. If excavation equipment such as a backhoe hits a high voltage line or a gas line, serious injury and property damage may result. Unintended severing of water mains and sewer lines generally leads to messy and expensive cleanup efforts. The unintended destruction of power and data cables may seriously disrupt the comfort and convenience of residents and bring huge financial costs to business. Therefore human-portable locators have been developed that sense electromagnetic emissions to thereby locate buried utilities such as pipes and cables. This is sometimes referred to as "line tracing." If the buried cables or conductors carry their own electrical signal, they can be traced by detecting the emissions at their appropriate frequency. Often signals with a known frequency are applied to pipes and cables via a transmitter to enhance the ease and accuracy of the line tracing. This can be done with an electrical clip in the case of a pipe, or with an inductive coupler in the case of a shielded conductor. Sometimes sondes are used to trace the location of pipes. These are tiny transmitters that are inserted into a pipe and emit electromagnetic signals at a desired frequency.

Portable utility locators typically carry one or more antennas that are used to detect the electromagnetic signals emitted by buried pipes and cables, and sondes that have been inserted into pipes. The accuracy of portable utility locators is limited by the sensitivity of their antennas. Signal interference caused by capacitance or inductance within the antenna structures causes resonance and interference. Additionally, methods of processing signals detected by antennas in portable utility locators by amplifying them and mixing them, have traditionally suffered from inefficiencies which include vulnerability to radio-frequency interference (RFI) and electromagnetic interference (EMI), and the introduction of undesirable capacitance and inductance.

Accordingly, there is a need to improve the sensitivity of antennas used in human-portable locators while improving their performance in isolating and processing signals of interest, and reducing design complexity and cost.

SUMMARY OF THE INVENTION

In accordance with the present invention, an antenna includes a bobbin made of a conductive material and having a gap formed therein, a conductive wire disposed around the bobbin to form a plurality of sub-coils, and insulation separating the wire conductively from the bobbin.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

DETAILED DESCRIPTION

The antenna of this invention, with suitable interface circuitry, is particularly suited for detecting electromagnetic fields in a human-portable utility locator such as that disclosed in co-pending U.S. patent application Ser. No. 11/248, 539 filed by Mark S. Olsson, et al. on Oct. 12, 2005 and entitled "RECONFIGURABLE PORTABLE LOCATOR EMPLOYING MULTIPLE SENSOR ARRAY HAVING FLEXIBLE NESTED ORTHOGONAL ANTENNAS."

A preferred embodiment of the present invention includes an antenna having a generally cylindrical conductive bobbin on which windings of the antenna are supported. Three of these antennas can be nested in a concentric arrangement so that they are mutually orthogonal and provide an antenna array for generating signals that represent measured signal strength and field angles in three orthogonal dimensions. This antenna is preferably coupled with a suitable preamplifier and mixer circuit to facilitate operation of the orthogonal antenna array.

Figure 1:
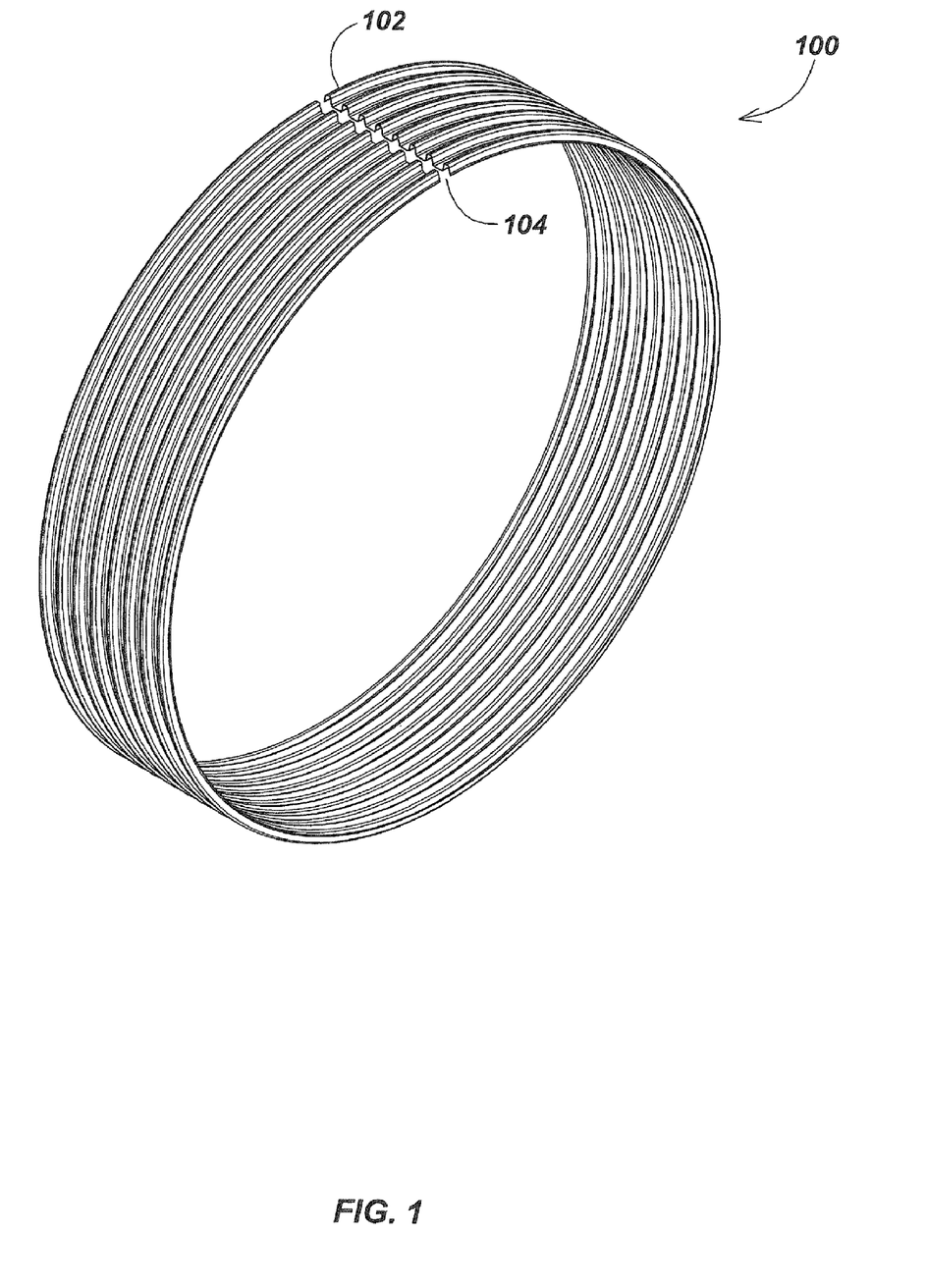
FIG. 1 is a perspective view of a conductive bobbin with a grooved surface feature.

FIG. 1 illustrates a generally cylindrical conductive antenna bobbin 100 made of a thin flexible metal core of, for example, three thousandths (0.003) inch thick copper foil. The copper foil is formed to provide a plurality of ridges defining a plurality of substantially equally axially-spaced apart generally U-shaped grooves 102. The bobbin 100 is formed with an axially extending gap 104, i.e. the two ends of the bobbin 100 are separated by a short distance. Different forming to produce ridges of a different cross-section may be advantageous. The bobbin 100 is formed out of copper foil and is not machined from metal, e.g. turned on a lathe. The thickness of the copper bobbin 100 is thus uniform throughout.

Figure 2:
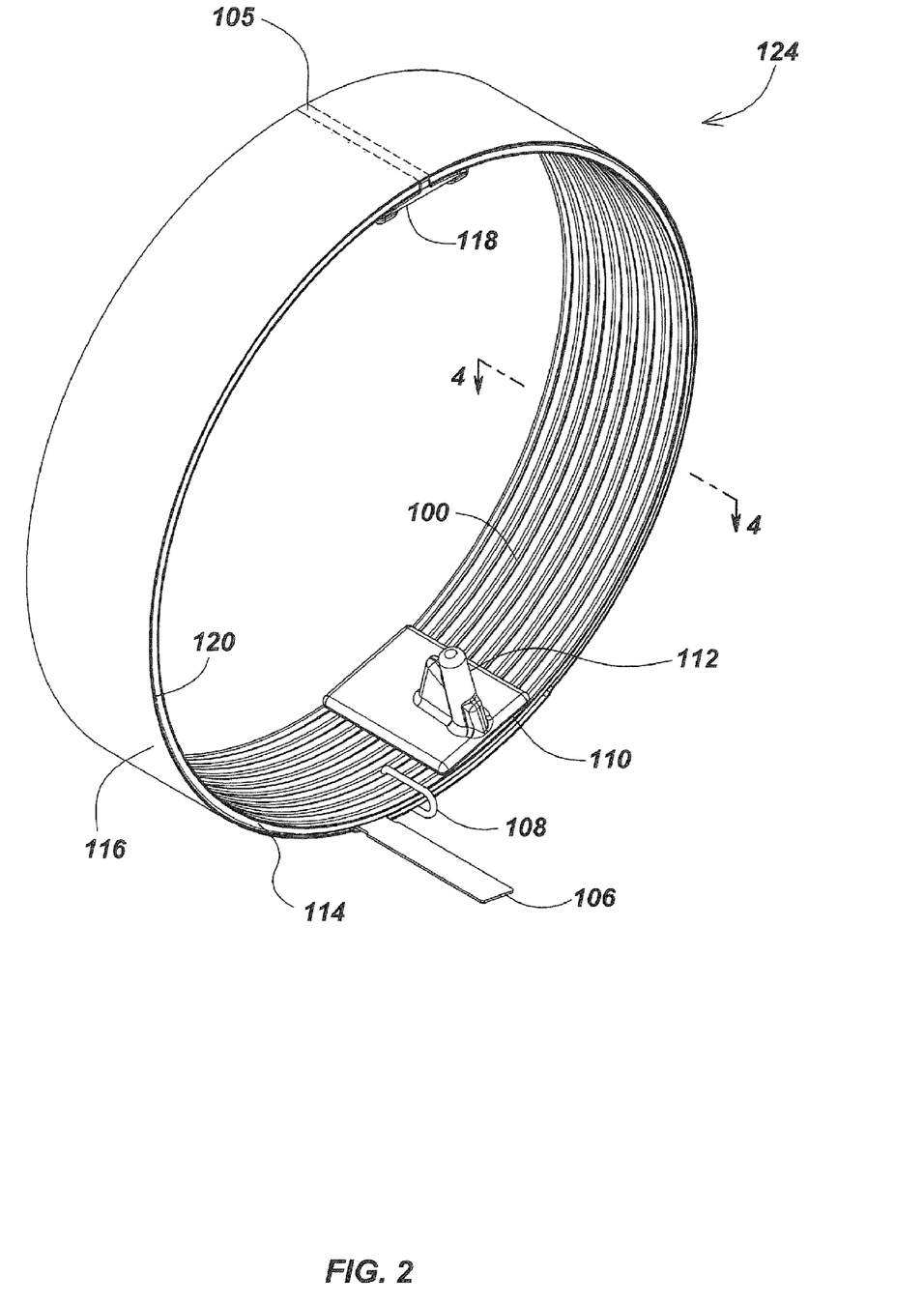
FIG. 2 is a perspective view of an exemplary embodiment of the antenna of this invention incorporating the conductive bobbin of FIG. 1.

FIG. 2 illustrates an antenna 124 incorporating the conductive bobbin 100 of FIG. 1. A plastic spacer 118 spans the gap 104 (FIG. 1), and is secured to the opposing ends of the bobbin 100. Spacer 118 serves as an insulator, and provides structural rigidity. A foot 110 also made of plastic or similar nonconductive material, is attached to the inner surface of the bobbin 100 situated generally diametrically opposite the spacer 118, and is formed with a riser 112. A thin insulating layer 114, made of a low dielectric-constant material such as TEFLON® tape is wrapped around the outer surface of the bobbin 100. Turns of the insulated wire (126 in FIG. 3) of the antenna 124 are laid in each of the grooves (102 in FIG. 1), of the bobbin 100 and are further insulated from the conductive copper of the bobbin 100 by the insulating layer 114 which does not form a jacket around the wire 126. The insulating layer 114 also reduces capacitive coupling of the insulated wire (126 in FIG. 3) to the conductive bobbin 100. The gap (104 in FIG. 1), in the conductive bobbin 100 is disposed to impose a symmetry on the bobbin 100 and any E-field charges it conducts. This symmetry cancels any residual E-field charge and maximizes the antenna's insensitivity to the E-field. The ridges (101 in FIG. 4) that form the grooves (102 in FIG. 1) provide electrostatic shielding that breaks up and distributes reactances that otherwise would exhibit lumped resonances. This places the resonances at much higher frequencies, thereby extending the useful frequency range of the antenna 124.

Figure 5:
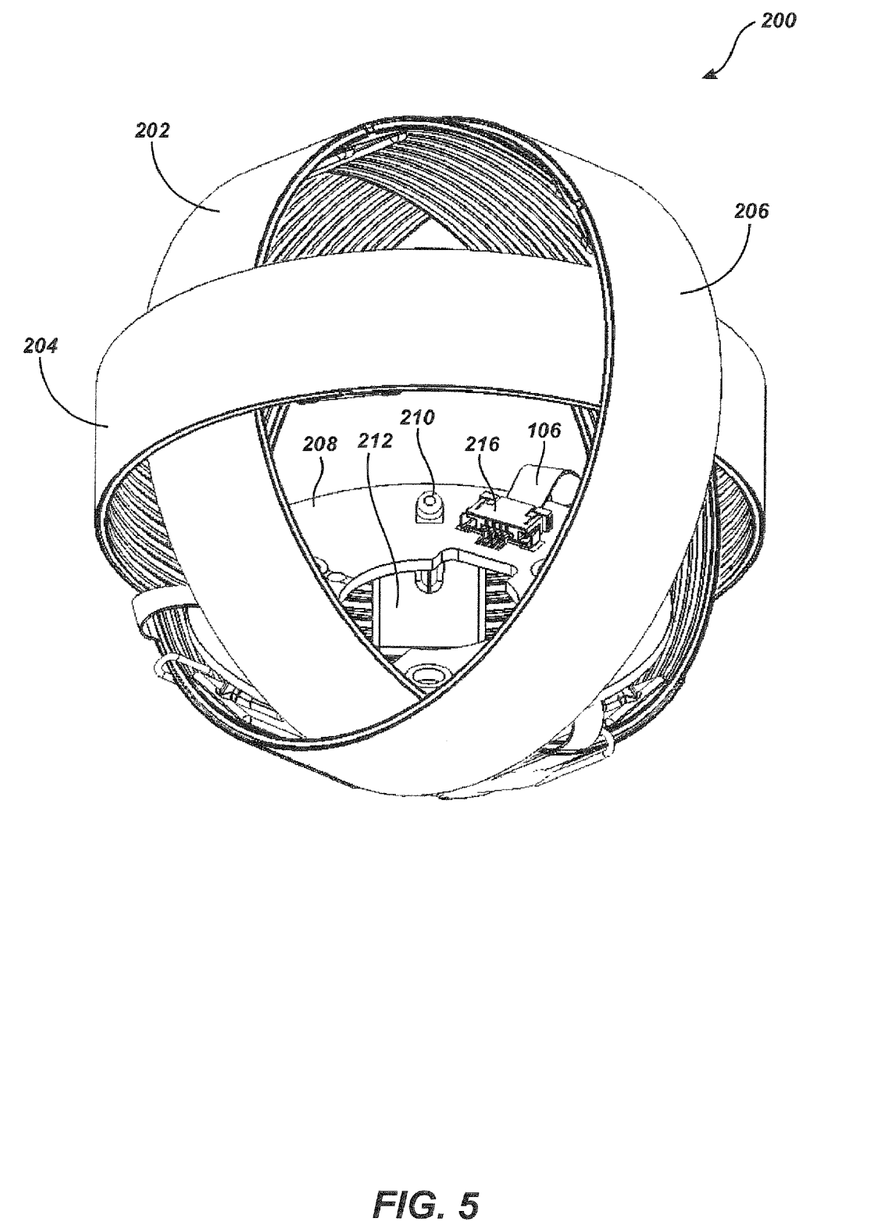
FIG. 5 illustrates an antenna array incorporating three orthogonally disposed antennas of the type illustrated in FIGS. 2 and 3.

The bobbin 100 may be made of other metal, such as silver, aluminum, gold or any other electrically conductive metal or alloy. Alternatively, the conductive bobbin 100 need not be made of formed metal. For example, the sub-coils may be formed on a plastic bobbin with a gap, and then sprayed with a conductive coating, or the gap could be masked and not coated. The gap (104 in FIG. 1) prevents a shorted turn in the bobbin. The extreme low thickness of the material relative to the diameter of the coil is a particular feature of the preferred embodiment of the present invention, a ratio of greater than 100. Also of note is the particular benefit of the coil being formed by a flexible and somewhat deformable material, enabling the nesting of multiple antennas in an omnidirectional configuration such as shown in FIG. 5. In the preferred embodiment, the thickness of the bobbin is uniform throughout and the material is formed, rather than machined.

Figure 4:
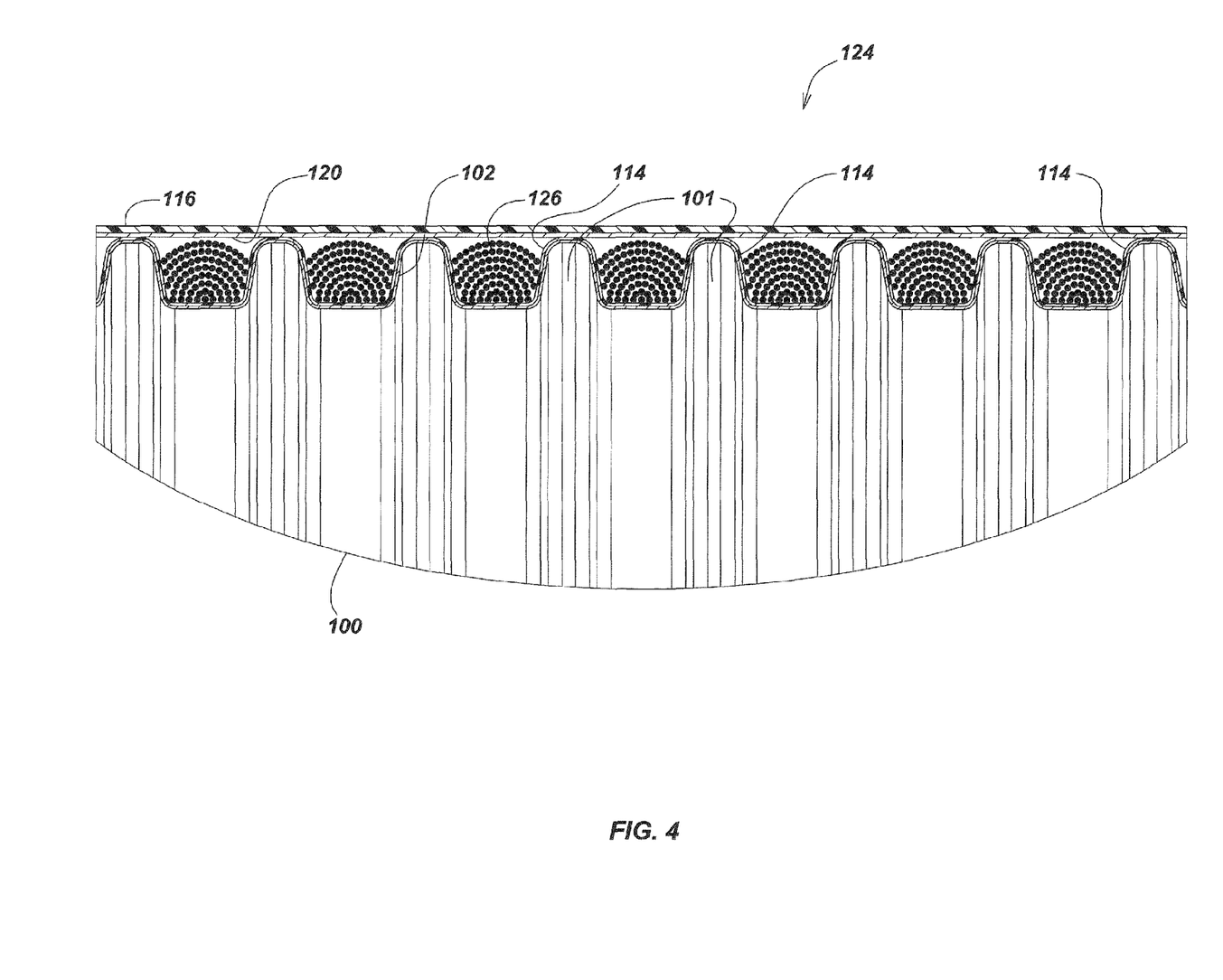
FIG. 4 is a greatly enlarged fragmentary cross-sectional view of the antenna embodiment of FIGS. 2 and 3 taken along line 4-4 of FIG. 2.

In the illustrated embodiment, seven identical grooves (102 in FIG. 1) are formed in the outer surface of the bobbin 100 by the creation of the ridges (101 in FIG. 4). The grooves (102 in FIG. 1) may be triangular, rectangular or some other useful cross-section shape. Multiple turns, such as sixty turns in the preferred embodiment, of the insulated wire (126 in FIG. 4) are wound within each groove to form therein a sub-coil. The wire (126 in FIG. 4) in the preferred embodiment is thirty-six gauge "magnet wire" formed of a copper core with an outer insulating jacket made of enamel. Clearly, wire having another gauge with a different metallic core and insulating jacket, such as polyester or NYLON® polymer for example, may also be used. After completing a sub-coil within a groove, a short segment (not shown) of the wire 126 jumps to the next groove where multiple turns are wound into another sub-coil, and this process repeats across the bobbin. Therefore the antenna 124 includes a plurality of axially spaced sub-coils. A layer of copper-foil tape 120 with an insulating backing is placed over the wire windings (126 in FIG. 4), with the conducting surface of the copper-foil tape facing outwardly and the insulating backing facing inwardly. The copper-tape layer 120 terminates in gap 105 exactly aligned with the inner bobbin gap (104 in FIG. 1), An outer layer 116 of KAPTON® tape or similar low dielectric material insulates the antenna 124 from other similar antennas in an orthogonal antenna array such as that hereafter described (FIG. 5). The diameter of the bobbin 100 is at least one-hundred times more than the thickness of the metal portion of the insulated wire 126. For example, the bobbin 100 may be three inches in diameter and the thickness of the conductive core of the wire 126 may be 0.003 inches.

Still referring to FIG. 2, an electrical connector 108 establishes an electrical ground connection between the inner conductive bobbin 100 and the outer conducting surface of the copper-foil tape 120. A flexible connector 106 brings connecting leads from the two ends of the wire windings (126 in FIG. 3), a ground trace from the associated printed circuit board (PCB), and connecting leads from the ground connector 108 which joins the inner and outer conducting surfaces, via a flexible printed circuit (FIG. 7) to the flexible connector 106. An outer layer 116 of KAPTON® tape or similar low dielectric material insulates the antenna 124 from other similar antennas in an orthogonal antenna array such as that hereafter described (FIG. 5).

Figure 3:
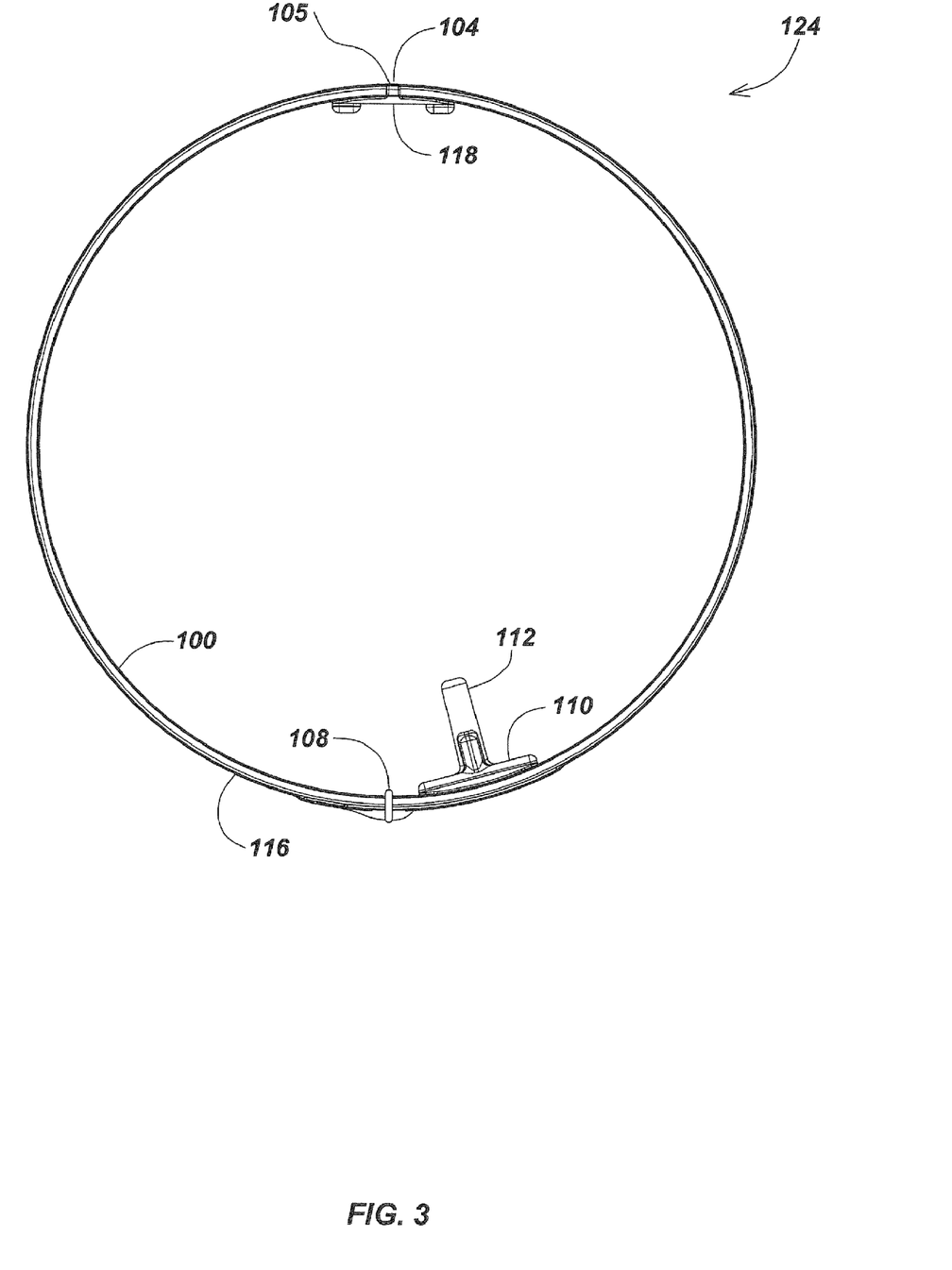
FIG. 3 is an end view of the antenna embodiment of FIG. 2.

Turning now to FIG. 3, a side view illustrates further details of the physical configuration of the antenna 124, the relative disposition of the inner bobbin gap 104 and the outer conductor surface gap 105 with the inserted spacer 118, and the foot 110. The alignment of gap 104 and gap 105 is an essential element to the workability of the present invention. In the preferred embodiment of this invention, the ends of the coil at the gap are so formed as to avoid any sharp edges that might cause the bobbin to short against the winding wire. Also visible in FIG. 3 are the formed riser 112 and the grounding connector 108 positioned between the inner surface of bobbin 100 and the copper-tape shielding layer (120 in FIG. 2). The outer layer 116 of KAPTON® tape is also visible in FIG. 3.

Referring now to FIG. 4, a section view of an embodiment of antenna 124 formed with seven grooves such as 102 is shown. The TEFLON® insulating layer 114 lies over the grooves 102 and over the ridges such as 101, cleaving to the profile of the formed copper bobbin 100. The antenna winding wire 126 is wound into the grooves 102 over the tape layer 114. The copper-foil tape 120 is positioned with its insulating backing facing the windings of wire 126, and the outer layer of KAPTON® tape 116 is positioned over the copper-foil surface of the copper foil tape 120 to insulate the antenna 124 from other antennas of similar configuration in a nested antenna array such as shown in FIG. 5. In an alternative embodiment, the TEFLON tape may optionally be wrapped around the outside of the wires under the outer copper shielding tape, for example.

As disclosed in FIG. 4, the use of formed copper foil as the bobbin 100 for the coils of the antenna improves the bandwidth of the antenna, and provides inherent electrostatic shielding. The ridges 101 serve to distribute reactances and break up inductive or capacitive resonances by effectively dividing the antenna 124 into a series of Faraday-shielded sub-coils, moving the inherent lumped resonances to higher frequencies and increasing useful antenna bandwidth. A metal foil cylinder with a smooth surface may be used for the bobbin 100 and copper rings may alternatively be positioned between the sub-coils to break up inductive or capacitive resonances. Because copper is thinner than a plastic form that might otherwise be used as a bobbin to support the wire windings, a copper bobbin of equivalent cross-section can support a higher number of turns of antenna wire in comparison, improving the sensitivity of the antenna. The outer layer of copper-foil tape 120 above the wire windings acts as a top electrostatic shield, and is electrically separated from the antenna wire itself and grounded, providing more effective E-field shielding.

The antenna 124 provides more antenna wire surface for an equivalent cross-sectional area, compared to prior art antennas, thus providing greater antenna sensitivity. The same innovation in design also divides the antenna into a series of Faraday-shielded sub-coils, which provides a higher bandwidth for the antenna by moving the inherent resonance of each coil into higher frequencies. The antenna 124 reduces the effects of inherent winding capacitance and creates a self-shielding effect for improved antenna sensitivity. The ridges 101 between the sub-coils which are formed in the grooves such as 102 are less wide across than the sub-coils formed in the grooves, as a method of increasing packing efficiency in the preferred embodiment. Thus, the space between each sub-coil is smaller than the width of each sub-coil.

Turning now to FIG. 5, an omnidirectional antenna array 200 includes three concentrically nested antennas 202, 204 and 206, arranged so that the coils of each antenna are substantially mutually orthogonal. Note that in the illustrated combination of three antennas, each antenna is an instance of the embodiment shown in FIGS. 1-4. Thus, the riser 210 is an instance of the riser element 112 in FIG. 3, and foot 212 is an instance of the foot element 110 in FIG. 3. The antennas 202, 204 and 206 are identical and have the same outer diameter. They can be nested because they are flexible and deformable because of the thin dimension and copper construction of the conductive bobbin (100 in FIG. 1) in the preferred embodiment. Within the sphere defined by the nested antennas 202, 204 and 206, a printed circuit board (PCB) 208 is supported on three risers exemplified by the riser 210 formed as part of the foot 212 connected to the antenna 204. With regard to each of the antennas 202, 204 and 206 a flexible connector, such as connector 214 of the intermediate antenna 204, leads to a four-pin connector 216 in which the central two pins are connected to the starting and ending leads of the winding wire (126 in FIG. 3). One outer pin of connector 216 is connected to the shield-ground connector (108 in FIG. 2), and the other outer pin is connected to a grounding trace from the circuit board 208.

Figure 6:
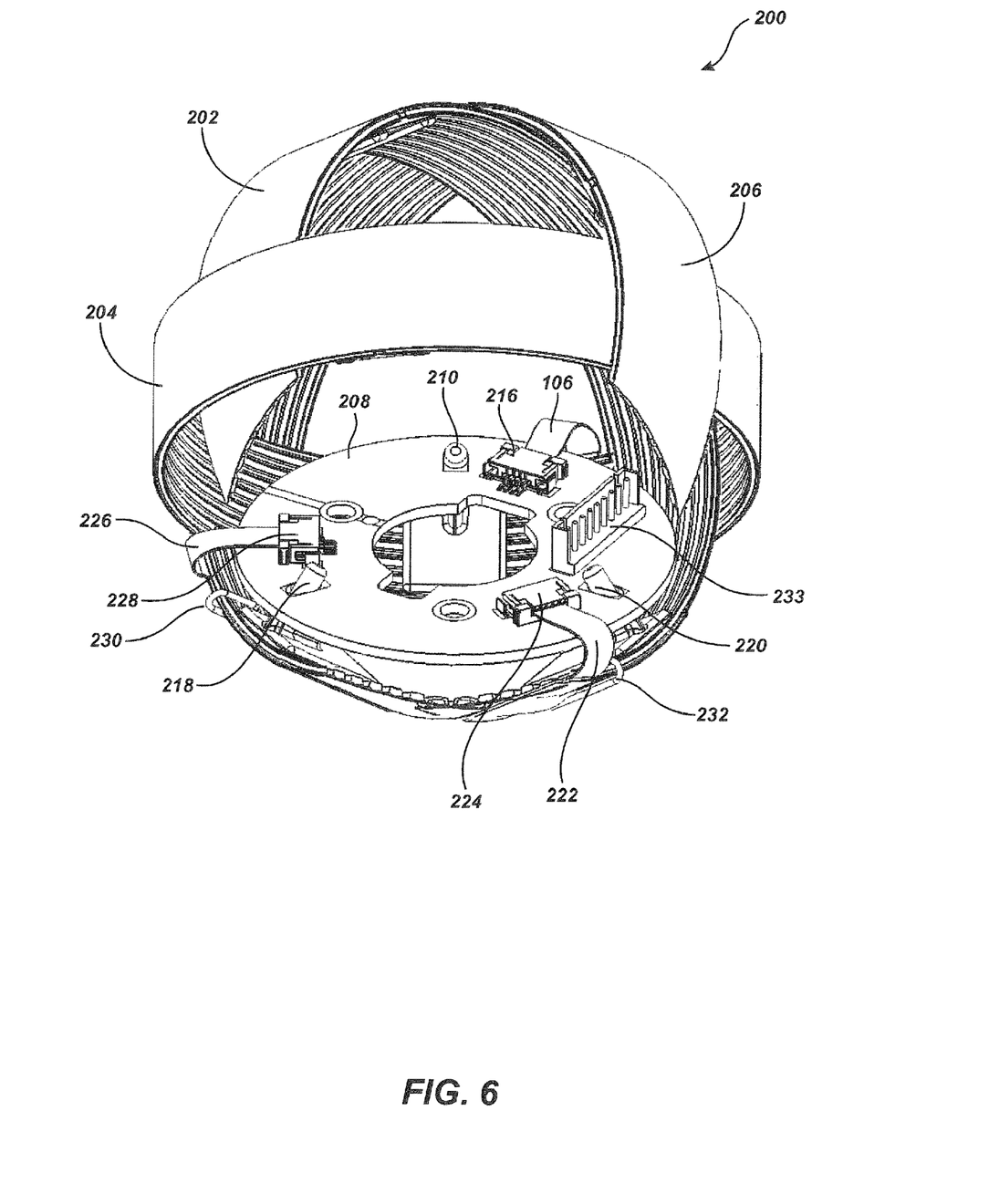
FIG. 6 is a fragmentary cutaway view illustrating additional construction details of the antenna array of FIG. 5.

Turning now to FIG. 6 a partial section illustrates circuit board 208 supported on three risers 210, 218, and 220 associated with the three antennas 202, 204 and 206. The circuit board 208 contains the components for a preamplifier and mixer circuit. The conductive back plane of the circuit board 208 is etched to form a gap along one radius to improve RF immunity without introducing loss or field distortion into the antenna. This feature effectively interrupts eddy currents and can be applied to any circuit board in proximity to a B-field antenna in any RF application.

Flexible-circuit connectors 106, 222, and 226 join leads from the coil windings (such as 126 in FIG. 3) of each of the antennas 202, 204 and 206. Shield-grounding connectors such as 230 and 232 join to four-pin connectors 216, 224, and 228. (The third shield-grounding connector is not visible in FIG. 6). A nine-pin connector 233 provides a means for linking the antenna array 200 to the associated locator circuitry. The nested mutually orthogonal antennas 202, 204 and 206 form a spherical array preferably contained within a pair of hemispherical plastic shells (not shown) that protect them from damage and facilitate mounting the antenna array 200 to a tubular plastic mast (not shown). Such tubular mast may extend through the center of each of the antennas 202, 204 and 206 with its upper end connected to the housing of a human-portable locator that contains the majority of the processing circuitry, the display and the batteries (not shown).

Figure 7:
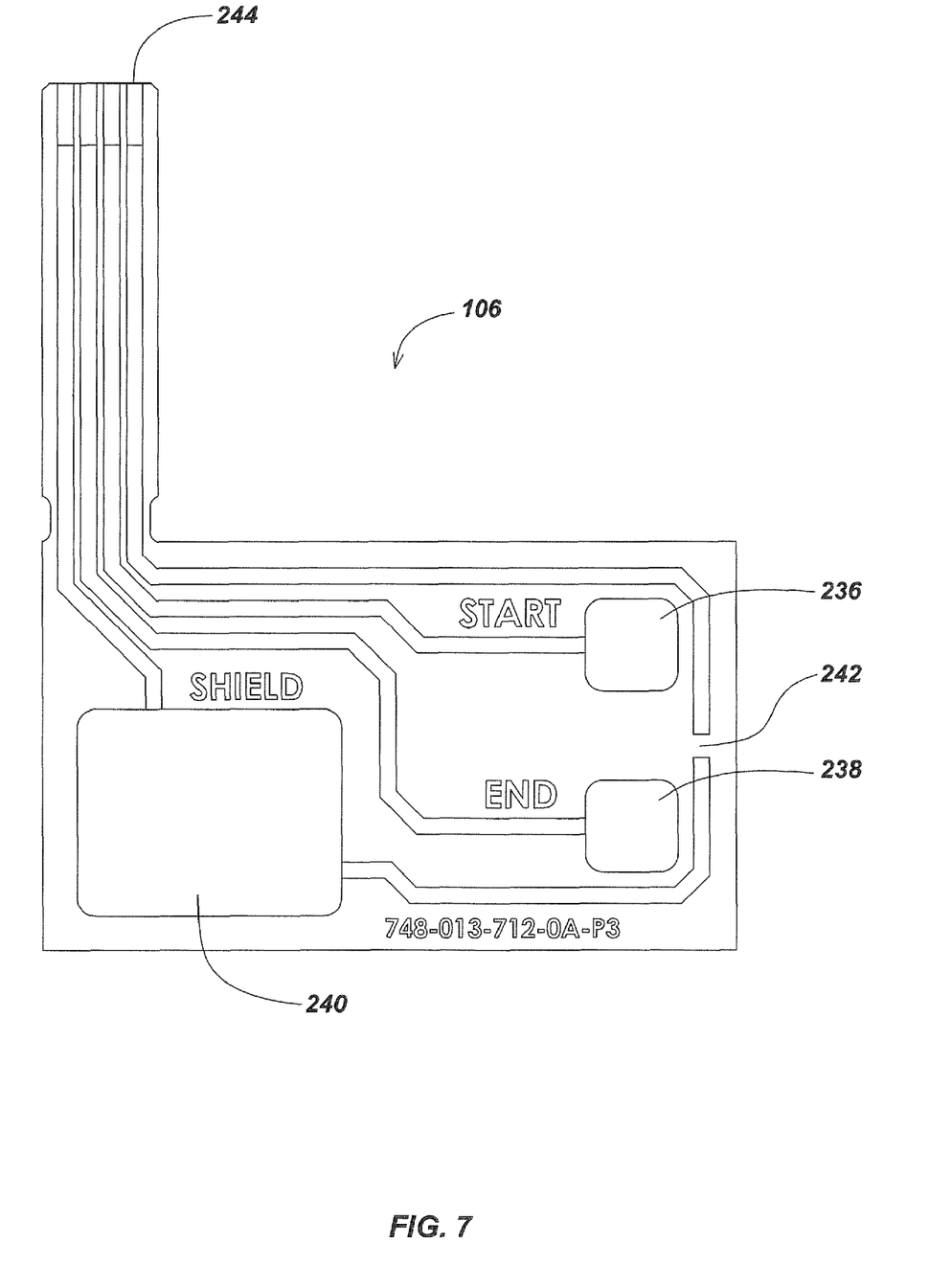
FIG. 7 is an enlarged plan view of a flexible connector useful for making electrical connections in the antenna array of FIG. 6.

We turn now to FIG. 7, showing the flexible connector 106, identical in design to flexible connectors 222 and 226 in FIG. 6. The flexible connector 106 has a conductive circuit formed on a flexible insulating substrate that includes conductive traces and/or pads for a "shields common" ground connection 240, as well as for the starting end of the windings 236, for the finish end of the windings 238, and for a ground trace 244 from the printed circuit board (208 in FIG. 6). A gap 242 is provided in the trace joining the shields ground connection 240 and the PCB trace connection 244 to prevent a ground loop, thereby reducing ambient noise transmission to the associated locator (not shown).

Thus, a man-portable buried utility locator of the type disclosed in U.S. Pat. No. 7,009,399, the entire disclosure of which is incorporated herein, or the aforementioned U.S. patent application Ser. No. 11/248,539, may include one or more antenna arrays of the type disclosed in FIGS. 5 and 6.

Clearly, other embodiments and modifications of this invention may occur readily to those skilled in the art in view of these teachings. Therefore, the protection afforded this invention is to be limited only by the following claims, which include all such embodiments and modifications when viewed in conjunction with the above specification and accompanying drawings.

We claim:

1. An antenna, comprising:
   a bobbin made of a conductive material and having a gap formed therein;
   a conductive wire disposed around the bobbin to form a plurality of sub-coils; and
   insulation separating the wire conductively from the bobbin.

2. The antenna of claim 1 wherein the insulation includes a jacket formed around the wire.

3. The antenna of claim 1 wherein the insulation includes a layer of a low dielectric material that separates the conductive bobbin and the wire and does not form a jacket around each wire.

4. The antenna of claim 1 wherein the bobbin has a plurality of grooves and the sub-coils are located in corresponding ones of the grooves.

5. The antenna of claim 1 and further comprising a ground connection attached to the bobbin.

6. The antenna of claim 1 and further comprising ridges formed in the bobbin that separate the sub-coils and break up resonances.

7. An antenna, comprising:
   a bobbin made of a conductive material and having a gap formed therein;
   a conductive wire disposed around the bobbin to form a plurality of sub-coils;
   insulation separating the wire conductively from the bobbin; and
   a ground connection attached to the bobbin in a location substantially diametrically opposite to the gap.

8. The antenna of claim 1 and further comprising a layer of an electrically conductive material overlying the wire to form an electrostatic shield.

9. The antenna of claim 8 and further comprising a layer of low-dielectric material overlying the layer of electrically conductive material to reduce capacitive coupling of the sub-coils to the bobbin.

10. The antenna of claim 1 and further comprising a spacer spanning the gap and connected to the opposing ends.

11. An antenna, comprising:
a flexible bobbin made of a conductive material and having an axially extending gap formed therein;
a conductive wire disposed around the bobbin to form a plurality of sub-coils; and
insulation separating the wire conductively from the bobbin.

12. The antenna of claim 11 wherein a diameter of the bobbin is at least one-hundred times a thickness of the conductive wire.

13. The antenna of claim 11 wherein the insulation includes as a jacket formed around the wire.

14. The antenna of claim 11 wherein the insulation includes a layer of a low dielectric material separating the conductive bobbin and the wire.

15. The antenna of claim 11 wherein the bobbin has a plurality of grooves and the sub-coils are located in corresponding ones of the grooves.

16. The antenna of claim 11 and further comprising a ground connection attached to the bobbin.

17. The antenna of claim 11 and further comprising means separating the sub-coils for breaking up inductive or capacitive resonances.

18. The antenna of claim 11 wherein the bobbin is made of copper foil.

19. The antenna of claim 11 and further comprising a spacer spanning the gap and connected to the opposing ends.

20. An antenna, comprising:
a bobbin made of a conductive material and having a gap formed therein;
a conductive wire disposed around the bobbin to form a plurality of sub-coils; and
a layer of a low dielectric material that separates the conductive bobbin and the wire and does not form a jacket around the wire.

21. An antenna, comprising:
a bobbin formed of copper foil having a uniform thickness and having a gap formed therein;
a conductive wire disposed around the bobbin to form a plurality of sub-coils; and
insulation separating the wire conductively from the bobbin.

22. An antenna, comprising:
a bobbin made of a conductive material and having a gap formed therein;
a conductive wire disposed around the bobbin to form a plurality of sub-coils, a space between each of the sub-coils being smaller that a width of each sub-coil; and
insulation separating the wire conductively from the bobbin.

23. An antenna array, comprising:
three substantially mutually orthogonal antennas each including a bobbin made of a conductive material and having a gap formed therein, three conductive wires disposed around corresponding ones of the three bobbins to form a plurality of sub-coils on each of the three bobbins, and insulation separating the three conductive wires from each of the corresponding bobbins.

24. A man-portable buried utility locator, comprising:
a man-portable housing;
at least one antenna array supported by the housing, the array having three substantially mutually orthogonal antennas each including a bobbin made of a conductive material and having a gap formed therein, three conductive wires disposed around corresponding ones of the three bobbins to form a plurality of sub-coils on each of the three bobbins, and insulation separating the three conductive wires from each of the corresponding bobbins; and
circuitry connected to the antenna array and partially mounted in the housing for determining and indicating to a user a location of a buried utility based on electromagnetic signals detected by the antennas.

25. An antenna, comprising:
a flexible cylindrical bobbin made of metal and having a plurality of axially spaced grooves and an axially extending gap formed therein;
a layer of insulation surrounding an outer surface of the bobbin;
a conductive wire disposed in the grooves and wound around the bobbin over the layer of insulation to form a plurality of axially spaced sub-coils;
a layer of metal-foil tape having an insulating backing wound about the conductive wire and having a second gap aligned with the gap in the bobbin; and
a layer of a low dielectric material wound about the metal-foil tape.

26. The antenna of claim 11, wherein the flexible bobbin comprises a plastic material having a conductive coating disposed thereon, the bobbin including an area where the conductive coating is masked or omitted to form the axially extending gap.

27. An antenna comprising:
a first flexible bobbin made of a conductive material and having an axially extending gap formed therein;
a first conductive wire disposed around the first bobbin to form a plurality of sub-coils;
insulation separating the first wire conductively from the first bobbin;
a second flexible bobbin made of a conductive material and having an axially extending gap formed therein;
a second conductive wire disposed around the second flexible bobbin to form a second plurality of sub-coils; and
a second insulation separating the second conductive wire conductively from the second flexible bobbin;
wherein the flexible bobbin and second flexible bobbin are deformed to be concentrically nested and positioned to be substantially mutually orthogonal.

28. The antenna of claim 15, wherein the plurality of sub-coils includes seven or more sub-coils.

29. The antenna of claim 15, wherein the grooves are bounded by ridges shaped to provide ones of electrostatic shields for corresponding ones of the plurality of sub-coils.

30. An antenna comprising:
a flexible bobbin made of a conductive material and having an axially extending gap formed therein;
a conductive wire disposed around the first bobbin to form a plurality of sub-coils;
insulation separating the first wire conductively from the first bobbin;
a metallic foil shield layer and an outer insulating layer to isolate the sub-coils from one additional antenna element, wherein the metallic foil shield layer is disposed between the plurality of sub-coils and the outer insulating layer and wherein the bobbin has a plurality of grooves and the sub-coils are located in corresponding ones of the grooves and wherein the grooves are bounded by ridges shaped to provide ones of electrostatic shields for corresponding ones of the plurality of sub-coils.

31. The antenna of claim 30, wherein the metallic foil shield layer includes a copper layer and an insulating layer attached thereto, the insulating layer positioned towards the plurality of sub-coils to isolate the copper layer from the sub-coils.

32. The antenna of claim 15, wherein the sub-coils include thirty or more windings.

33. The antenna of claim 1, wherein the bobbin is a substantially circular bobbin having a diameter approximately three or more times the axial width.

34. The antenna of claim 33, wherein the bobbin is formed to be flexible along the diameter to allow nesting within similar bobbins for form an antenna array.

35. The antenna of claim 4, wherein the grooves are all of substantially the same width.

* * * * *